March 1, 1960 W. A. CRANDALL 2,926,527
FLUID SAMPLING APPARATUS
Filed March 7, 1958 2 Sheets-Sheet 1
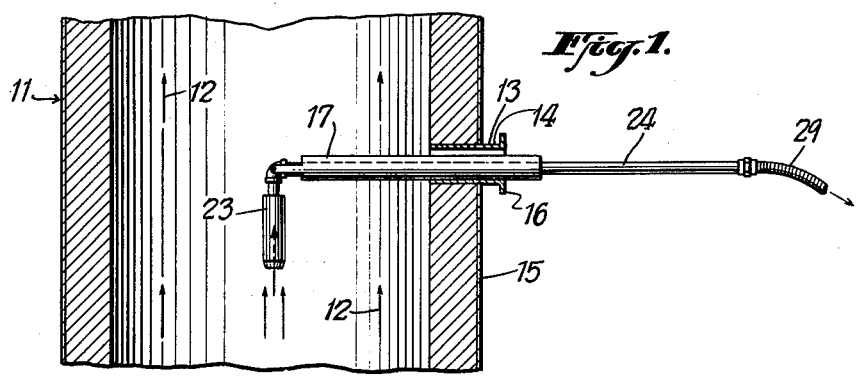
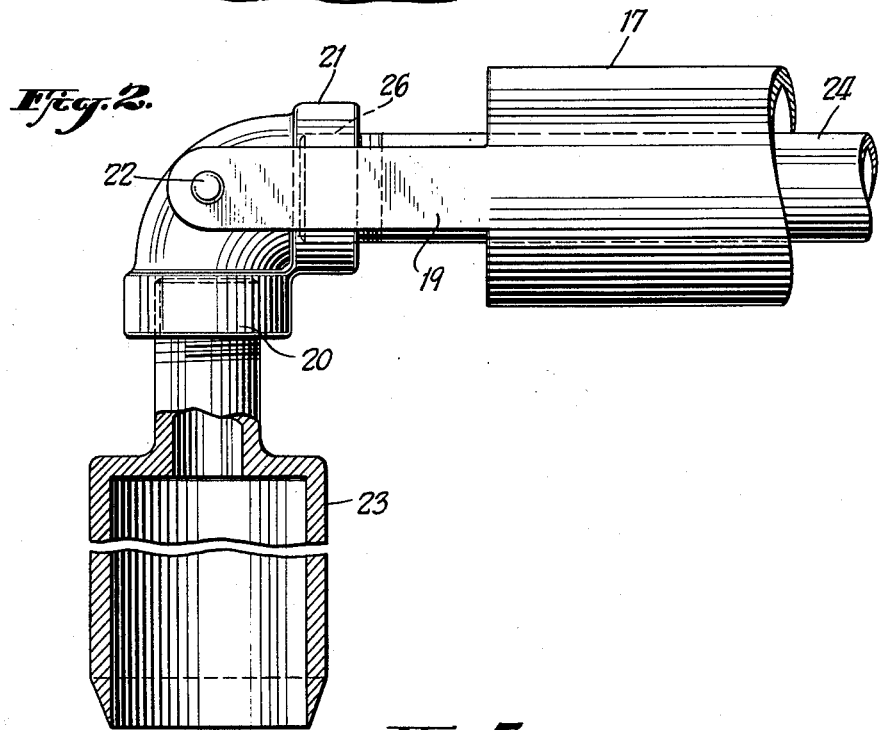
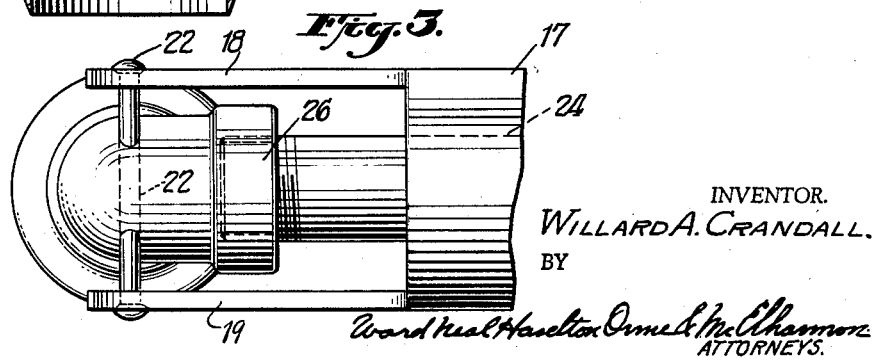
INVENTOR.
WILLARD A. CRANDALL.
BY
ATTORNEYS.

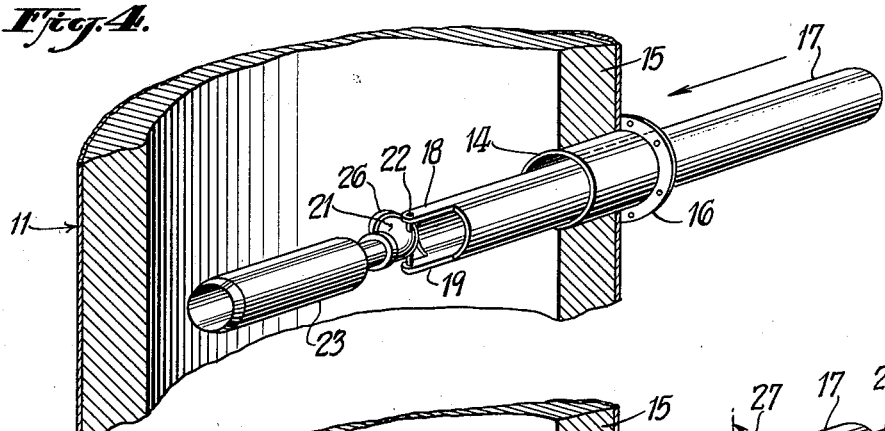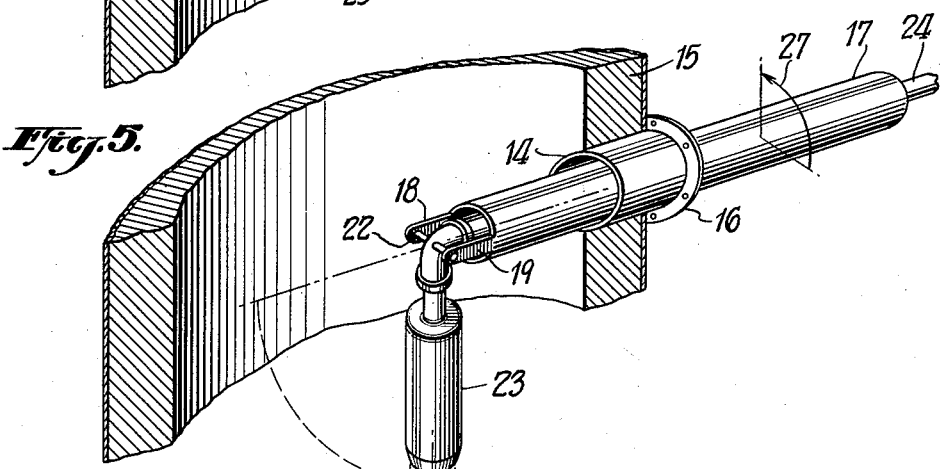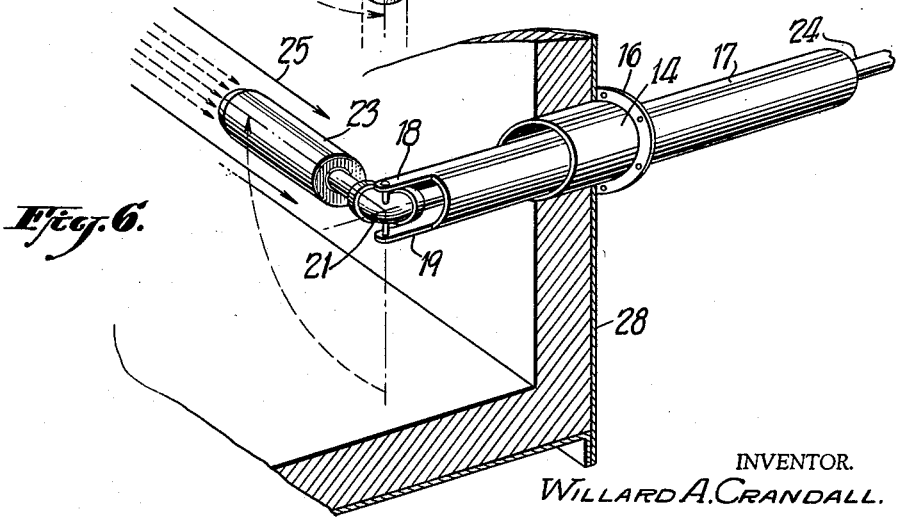

United States Patent Office 2,926,527
Patented Mar. 1, 1960

2,926,527

FLUID SAMPLING APPARATUS

Willard A. Crandall, Rutherford, N.J., assignor to Consolidated Edison Company of New York, Inc., New York, N.Y., a corporation of New York Application March 7, 1958, Serial No. 719,935

3 Claims. (Cl. 73—421.5)

This invention relates to apparatus for sampling fluid, such as the sampling of flue gas to determine the fly ash content, and particularly to mechanism for adjustably supporting an elbow utilized to interconnect conduits disposed at a fixed angle one with respect to the other.

In many instances a fixed angle pipe connection is desired in locations which are normally inaccessible for making such connections. This problem is especially acute in situations where it is desired to obtain a sample of a fluid flowing through a conduit, as for example when it is desired to sample flue gas passing through a flue pipe to determine the amount of fly ash present. To accomplish such fluid sampling it is necessary to position a nozzle in the conduit so that the axis of the nozzle is parallel to the direction of flow of the fluid. The nozzle should then be connected to a length of pipe leading through an opening in the wall of the conduit. Since the conduit in which it is desired to sample the fluid flow may be oriented in almost any direction, it is highly desirable that the nozzle form a rigid angle connection with the pipe leading out of the conduit in order that the nozzle may be turned to the desired direction so as to parallel the direction of flow which may be encountered.

The size of the nozzle used should be varied according to the desired sampling rate and the linear velocity of the fluid in the conduit in order to obtain a truly representative sample. If a nozzle of the proper size and shape is not used, undesirable turbulance may be set up in the vicinity of the nozzle tip and a representative sample may not be obtained.

In practice, it is frequently impossible to insert a nozzle of the proper size and shape, rigidly connected to a length of pipe by a fixed angle connection through the openings available in a conduit in which it is desired to sample the fluid flow. It is a purpose of the present invention to provide means for avoiding the above mentioned difficulty.

In accordance with a preferred embodiment of the present invention, the above mentioned difficulties are avoided by the use of a sleeve and a fixed angle conduit connector pivotally mounted about an axis extending transversely of and preferably perpendicular to the axis of the sleeve with one end of the connector being adapted to receive a sampling nozzle and the other end of the connector being adapted to receive a conduit inserted through the sleeve at said fixed angle to the nozzle.

Various further and more specific objects, features and advantages of this invention will appear from the description taken in connection with the accompanying drawings which form a part of this specification and illustrate by way of example certain embodiments of this invention. The invention consists in such novel features and combinations as may be shown and described in connection with the apparatus herein disclosed.

In the drawings:

Fig. 1 is an elevational view, partly in section, showing the use of fluid sampling apparatus constructed in accordance with this invention in sampling fluid flow in a vertical pipe;

Fig. 2 is an elevational view on an enlarged scale, partly in section, showing in greater detail a portion of the apparatus shown in Fig. 1;

Fig. 3 is a plan view of the apparatus shown in Fig. 2;

Fig. 4 is a perspective view, partly in section, showing the insertion of the sampling apparatus shown in Fig. 1 into a vertical conduit;

Fig. 5 is a view similar to Fig. 4 but shows a later stage of the same operation; and Fig. 6 is a perspective view, partly in section, illustrating the use of the sampling apparatus shown in Fig. 1 in sampling fluid flow in a horizontal conduit.

Referring to Fig. 1, a vertical flue conduit 11 is shown in which flue gas is travelling in an upward direction as indicated by the arrows such as 12. An aperture 13 is provided in a wall 15 of conduit 11 so that sampling apparatus can be inserted into the conduit. The wall 15 may comprise a single layer of material such as steel or brick or may comprise two or more layers of suitable material with or without interior air spaces or insulation. A short piece of pipe 14 is inserted in aperture 13 to prevent leakage of gases from the conduit 11 into the interior of the wall 15 in the event the interior of such wall is porous. Pipe 14 is permanently sealed with respect to the interior surface of flue conduit 11 and is provided with an end flange 16 adapted to receive a cap in order to seal the opening 13 when it is not in use. When sampling apparatus is inserted through the pipe 14, any suitable means such as rubber gaskets (not shown) may be used to seal the space around the sampling apparatus.

As shown in detail in Figs. 2 and 3, the sampling apparatus includes a sleeve 17 having longitudinally extending oppositely disposed arms 18 and 19 projecting therefrom. The sleeve 17 in the present embodiment is conveniently of tubular cylindrical shape but may comprise an open framework such as several longitudinal pieces connected only near their ends or by spaced circumferential members. A fixed angle connector such as a pipe elbow 21 having threaded end openings 20 and 26 is pivotally mounted between the ends of extensions 18 and 19 by means of a pin 22 rigidly secured to elbow 21 and freely journaled in arms 18 and 19. Any suitable means may, of course, be used to mount elbow 21 on a sleeve such as 17. Extensions 18 and 19 may take any suitable form and may, for instance, be connected to or may form a projection of the sleeve 17 having a slot to allow rotation of the elbow 21 and an attached nozzle as described below. A sampling nozzle 23 is detachably secured in opening 20 of the elbow 21 as by a conventional thread connection. Nozzle 23 could be permanently attached to the elbow but it is preferred to have nozzle 23 removable so that nozzles of different sizes and shapes may be used for sampling fluid under varying conditions.

Usually the aperture 13 is perpendicular to the flow axis of the fluid conduit such as 11 and in the present embodiment of the invention this condition will be taken as illustrative. In such case the connector elbow 21 will be a right angle elbow. Similarly in the event that the aperture 13 should extend at a different angle to the flow axis then the fixed angle of elbow 21 could correspond to said different angle.

Referring to Figs. 1–3 and 5 a sample-carrying conduit such as pipe 24 is shown detachably secured in opening 26 of elbow 21. With particular reference to Fig. 4, it can be seen that the pipe 24 is detached from the elbow 21 when the apparatus is inserted into the flue conduit 11. When it is desired to insert the apparatus into the flue conduit 11, a suitable nozzle such as 23 is first connected to one end of the elbow 21, such as the opening 20, and the nozzle is then positioned parallel with the sleeve 17 by rotating the elbow 21 about the pin 22. The apparatus is then in suitable condition for insertion into the pipe 11. In order to insure that the sampling nozzle remains parallel to the sleeve during insertion so as to prevent jamming in the pipe 14, it is preferable to insert the sleeve with the pin 22 in a vertical position. With the pin 22 in a vertical position the weight of the nozzle 23 together with the friction at the points where pin 22 is journaled in extensions 18 and 19, tends to prevent undesirable rotation of the elbow 21 during insertion. When the apparatus has been inserted into the conduit 11 as shown in Fig. 4, the sleeve 17 may be rotated in a direction, as indicated by the arrow 27 shown in Fig. 5. As the pin 22 assumes a horizontal position, the weight of the nozzle 23 causes the elbow 21 to rotate about the axis of pin 22 until the nozzle 23 is hanging in a vertical downward direction from the pin 22. The direction in which the sleeve should be rotated from the position shown in Fig. 4 to attain the position shown in Fig. 5 necessarily depends on which end of the elbow 21 the nozzle is attached to. In any event, the sleeve should be rotated in whatever direction will cause the open end of the elbow 21 to be facing the sleeve 17 when the nozzle is hanging in the vertical position shown in Fig. 5. It is not of course essential that the pin 22 be in the vertical position when the apparatus is inserted since, particularly with a thin walled pipe, it might be equally desirable to maintain the pin in a horizontal position and allow the sampling nozzle to fall into the vertical position as soon as it has cleared the wall of the pipe sufficiently to do so.

For the mechanism to pass through pipe 14 it is, of course, necessary that the length of the end 26 of the elbow 21 be sufficiently short to pass through the pipe 14 when the nozzle is parallel with sleeve 17 as shown in Fig. 4, the sampling nozzle can thus be inserted through pipe 14 even though it could not be inserted when attached to pipe 24 due to the length of the end 20 of elbow 21 and the attached nozzle 23.

Once the sampling nozzle 23 has been brought into a vertical position through the force of gravity, the open end 26 of the elbow 21 will be facing the sleeve 17 in such a position that it is possible to insert the pipe 24 through the sleeve and connect it to the elbow 21 as by an ordinary thread connection. When the pipe 24 has been thus connected to the elbow 21, a rigid connection is produced as shown in Fig. 5 and the sleeve 17 may then be rotated in any desired direction while maintaining a rigid, tight connection between nozzle 23 and pipe 24.

It can be appreciated that the apparatus as described is not limited to sampling fluid flow in vertical pipes but, since the nozzle can be rotated about the axis of sleeve 17 to any desired angle in the vertical plane passing through the axis of nozzle 23. In the present embodiment, this vertical plane through the nozzle axis is perpendicular to the sleeve 17, whereby fluid sampling may be accomplished in a flue conduit having fluid flow in almost any direction. Fig. 6, for example, illustrates the use of the sampling apparatus shown in Figs. 1-5 to sample the fluid flow in a horizontal flue or duct 28 in which the direction of fluid flow is horizontal as indicated by the arrows such as 25. To position the sampling nozzle in the position shown in Fig. 6 it is merely necessary to proceed as described in connection with Figs. 4 and 5 and then, after the pipe 24 has been connected to make a rigid connection between the sampling nozzle 23 and pipe 24 through the elbow 21, the whole assembly may be rotated by rotating the sleeve 17 through a 90° angle so that the nozzle is horizontal as shown in Fig. 6.

Referring again to Fig. 1, a flexible tube 29 is shown attached to the end of pipe 24. Once the fluid being sampled has passed through pipe 24 it may be withdrawn by means of tube 29 or any other appropriate fluid transporting means and passed to any suitable measuring or collecting equipment as desired.

In removing the apparatus from conduit 11 or conduit 28, the procedure of insertion is essentially reversed. The first step is to remove the pipe 24 as by unscrewing and withdrawing. The sleeve 17 may then be withdrawn through pipe 14. As the nozzle 23 encounters the interior of wall 15 during withdrawal, the elbow 21 will pivot about pin 22 so that the nozzle 23 will be forced into a position approximately parallel with the sleeve 17 in order to pass through the pipe 14.

While the invention has been described in detail with respect to certain preferred embodiments, it will be understood by those skilled in the art that various changes and modifications may be made without departing from the spirit and scope of the invention and it is intended to cover all such changes and modifications in the appended claims.

It is claimed:

1. Apparatus comprising in combination a sleeve; a pair of oppositely disposed arms extending longitudinally from the outer periphery of an end of said sleeve; and a fixed angle elbow pivotally mounted between said arms for angular movement about an axis, one end of said elbow being adapted to receive a first conduit and the other end of said elbow being adapted to receive a second conduit inserted through said sleeve at an angle to said first conduit corresponding to the fixed angle of said elbow.

2. Apparatus comprising in combination, a sleeve; a pair of oppositely disposed arms extending longitudinally from the outer periphery of an end of said sleeve; a fixed angle elbow pivotally mounted between said arms for angular movement about an axis, one end of said elbow being adapted to receive a sampling nozzle; and a pipe adapted to pass through said sleeve and to be detachably connected to the other end of said elbow to provide a rigid assembly rotatable along with said sleeve to present said sampling nozzle at any angle in a plane angular to the longitudinal axis of said sleeve by an angle equivalent to the angle of said elbow.

3. Apparatus for sampling fluid flow in a conduit, comprising in combination; a sleeve adapted to be inserted through an opening in a wall of the conduit; a pair of oppositely disposed arms extending longitudinally from the pheriphery of an end of said sleeve; a fixed angle elbow pivotally supported between said arms, one end of said elbow being adapted to receive a sampling nozzle and the other end of said elbow being of a length short enough to pass through the conduit opening with said sleeve when said sampling nozzle is positioned to extend forwardly of said sleeve, said nozzle being free to rotate with said elbow under the influence of gravity within said conduit to present said other end of said elbow to the longitudinal axis of said sleeve in a direction facing the opening in the conduit wall; and a pipe adapted to pass through said sleeve to be detachably secured to said other end of said elbow after insertion and rotation of said nozzle as aforesaid to provide a rigid assembly rotatable in said conduit to present said sampling nozzle at any desired angle in the conduit in a plane angular to the longitudinal axis of said sleeve by an angle equivalent to the angle of said elbow.

References Cited in the file of this patent

UNITED STATES PATENTS 2,472,425   Howard _____ June 7, 1949